Patented Dec. 31, 1940

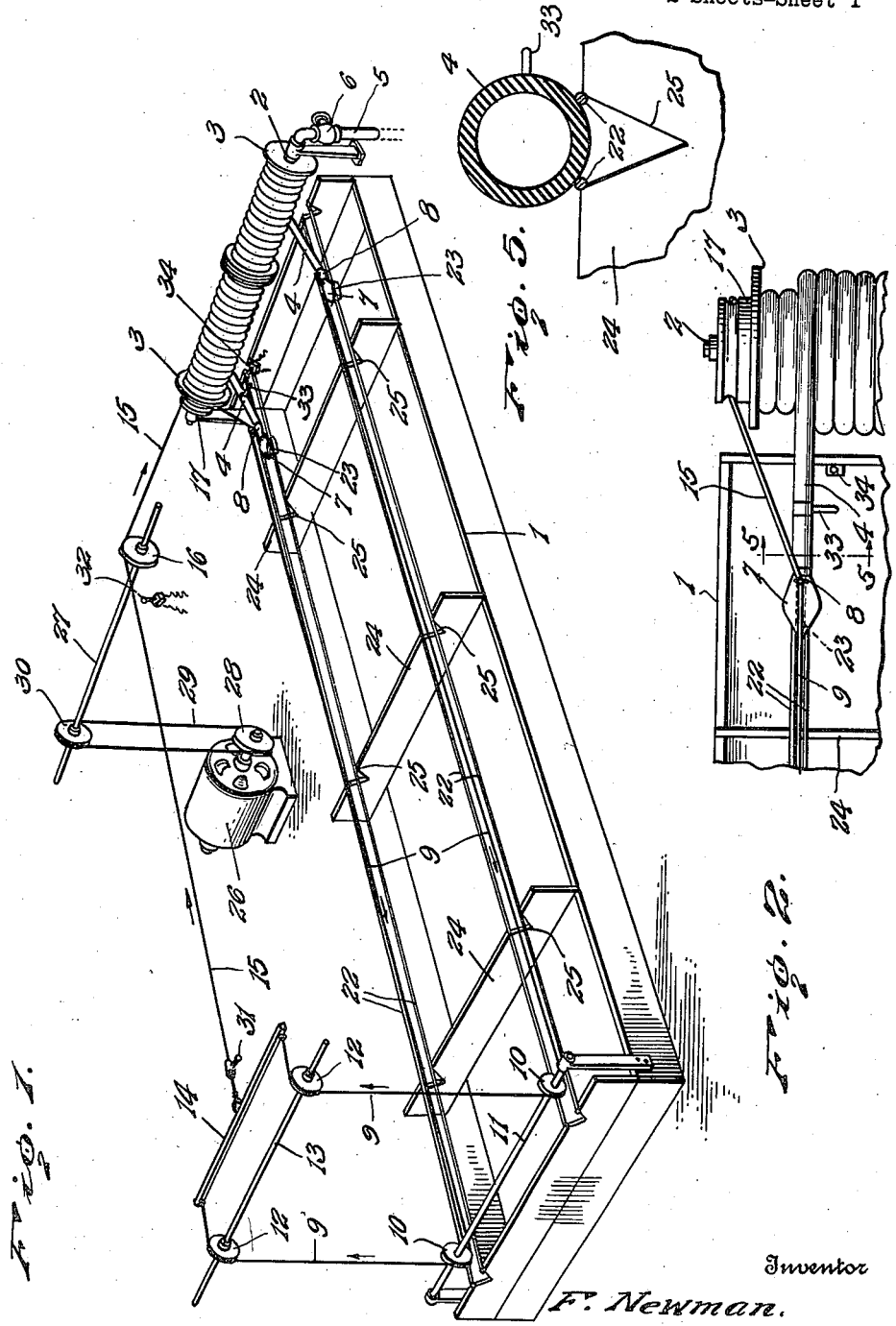

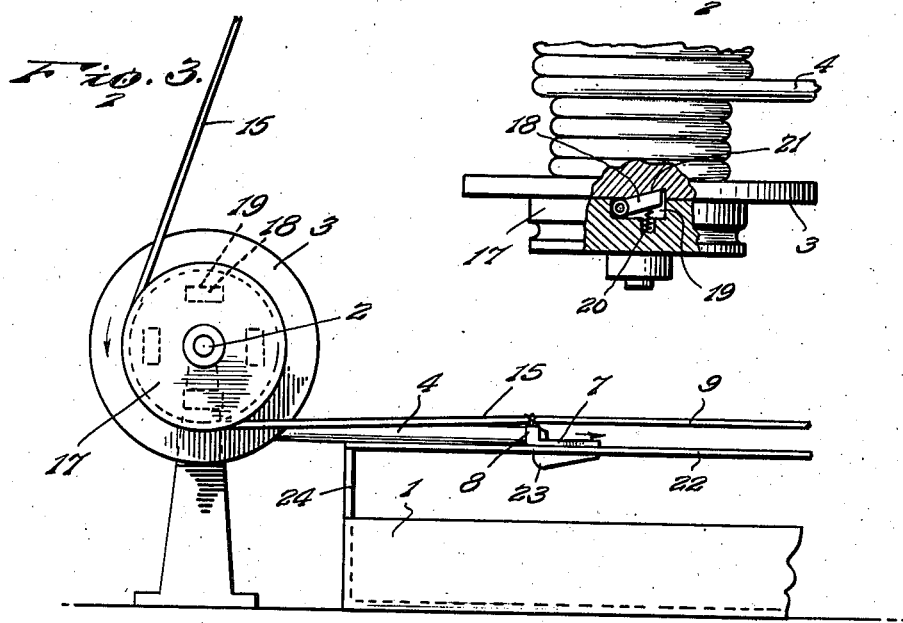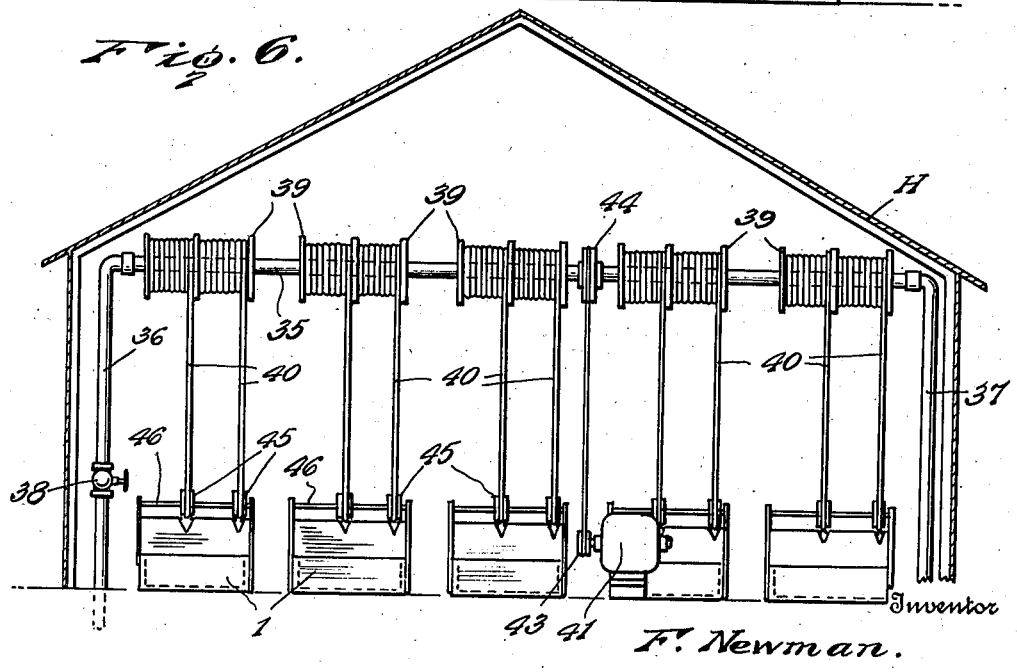

2,226,668

UNITED STATES PATENT OFFICE 2,226,668

AUTOMATIC WATERING DEVICE

Frederick Newman, Newtown, Pa.

Application November 3, 1938, Serial No. 238,703

5 Claims. (Cl. 299—55)

This invention relates to an automatic watering device, and it is one object of the invention to provide a device of this character wherein hose pipes are mounted upon reels and means provided for unwinding the hose pipes from the reels and moving the same longitudinally of flower beds so that the growing plants in the beds will be watered throughout the length of the beds.

It is another object of the invention to provide improved means for unwinding the hose pipes from the reels and moving the same along the beds over the same until the hose pipes have been extended the full length of the beds, the motor for operating the device being then reversed so that the hose pipes may be rewound and the motor shut off by operation of a switch when the hose pipes are completely rewound upon the reels.

Another object of the invention is to provide improved means for simultaneously unwinding hose pipes from two or more reels and in addition so mount the reels that they may be freely turned about a shaft during unwinding of the hose pipes and have rotary motion imparted to them during a rewinding operation.

Another object of the invention is to provide an apparatus of this character which will at all times be ready for use at the same time be out of the way when not in use.

Another object of the invention is to provide a watering apparatus which is of a simple construction, very easy to install and operate and not liable to get out of order.

The invention is illustrated in the accompanying drawings, wherein:

Figure 1 is a perspective view showing the improved watering apparatus mounted in position for use in cooperating relation to a hothouse bed.

Figure 2 is a top plan view showing one end portion of the hose reel and an adjoining corner portion of a hothouse bed, Figure 3 is a side elevation of the portion of the apparatus shown in Figure 2.

Figure 4 is a view upon an enlarged scale of the end portion of the reel shown in Figure 2 with portions in section, Figure 5 is a transverse sectional view of the line 5—5 of Figure 2, and Figure 6 is a view in elevation showing a modified embodiment of the invention.

This improved apparatus has been shown erected in connection with the bed 1 of a hothouse H, though it is to be understood that it is not restricted to this use as it may be used in connection with outside beds for watering plants growing in a field. The beds may be of any shape and dimensions desired but are preferably oblong and of appreciably greater length than width, as shown in Figure 1. Across one end of the bed extends a hollow pipe or tube 2 constituting a shaft for a pair of drums 3, although a single drum may be provided if so desired. Each drum carries a hose pipe 4 having its inner end connected with the hollow pipe or tube in a conventional manner so that water which is fed into the tube from the supply pipe 5 may flow through the hose pipe when the valve 6 of the supply pipe is open. When separate drums are used, they may be connected to turn together in any desired manner.

Spray nozzles 7 are secured to outer ends of the hose pipes, and each nozzle has a hose encircling collar or clamp 8 and a depending fin or keel 23 secured to one end of a pull line or light cable 9 extending longitudinally of the bed 1. The lines or cables 9 are trained about guide pulleys 10 carried by a shaft 11 extending across the other end of the bed and after being extended upwardly are engaged about a second set of guide pulleys 12 carried by an overhead shaft or rod 13. The upper ends of the pull lines are secured to a cross bar or yoke 14, and to this yoke is secured one end of a cable 15 which extends longitudinally of the bed in an overhead position and is wrapped about a pulley 16 of the friction drive type. The cable 15 extends rearwardly from the pulley 16, and after being engaged about the drum 17 loosely carried by the shaft 2 is brought forwardly and secured to the collar 8 of the spray nozzles for the adjacent hose pipe. The drum or spool 3 is free to rotate independently of the drum or pulley 17, in order that the spool and pulley may be caused to turn together at certain times, there have been provided pawls 18 which are pivotally carried by the drum 17 in recesses or pockets 19 formed therein and urged outwardly by companion springs 20 for engagement in the notches or pawl receiving recesses 21 formed in the confronting end of the spool 3. During rotation of the pulley or drum 17 in a direction to permit the hose pipe to be withdrawn or unwound from the spool by pull exerted upon the cables 9, the drum 17 may be turned about the shaft 2 independently of the spool 3, and pull upon the hose pipes will unwind this from the spool, but when the drum 17 is turned in an opposite direction, or opposite to that indicated by the arrows in Figure 3, the pawls will have interlocking engagement with the spool and turn the spool in a direction to wind the hose pipe thereon. Strong wires 22 which extend longitudinally of the bed 1 at opposite sides of the pull lines or cables 9 serve as supporting tracks for the spray nozzles 7 and the hose pipes 4, and each nozzle rests upon the wires constituting the tracks with its depending fin projecting downwardly between the wires and preventing transverse movement out of engagement with the wires. It will thus be seen that the nozzles will be well supported during their movement along the bed and prevented from shifting transversely out of a straight line. Bridging strips 24 extend across the bed and are formed with notches 25 through which the depending fins pass. Therefore, the bridging strips may support the wires without interfering with longitudinal movement of the spray nozzles and their guide fins.

The motor 26, by means of which the apparatus is operated, is mounted upon the ground or upon a suitable support under a shaft 27 which carries the friction drive pulley 16, and this motor carries a pulley 28 about which is engaged a belt 29 extending upwardly therefrom and trained about a pulley 30 carried by the shaft 27. Therefore, when the motor is in operation, rotary motion will be transmitted to the shaft, and since the friction drive pulley is fixed to this shaft, it will be turned with the shaft and the cable 15 shifted longitudinally. When the cable 15 is shifted longitudinally in the direction indicated by the arrows in Figure 1, pull will be exerted upon the cross bar or yoke 14 and the cable 9 to unwind the hose pipe from the spool 3 and move the nozzles 7 along the track formed by the wires 22 to sprinkle water upon the growing plants in the bed 1. As the nozzles approach the opposite end of the bed during unwinding of the hose pipe, an abutment 31 carried by the cable 15 close to the cross bar or yoke 14 will approach the shaft 27 and engagement of the abutment with the reversing switch 32 will operate this switch and cause reversing of the motor. The shaft 27 will then be turned in a direction to shift the cable 15 longitudinally in a direction for exerting rearward pull upon the spray nozzles to which it is attached and the drum or pulley 17 will be turned in a direction to effect clutching engagement with the spool and rotate the spool in a direction to wind the hose pipes thereon. It will thus be seen that the hose pipes may be unwound from the spool until their nozzles reach the opposite end of the bed 1 and the motor will then be reversed and rotary motion imparted to the pulley or the drum 17 in a direction to wind the hose pipes upon the spool, this reversal being automatically accomplished by engagement of the abutment 31 with the reversing switch 32. An abutment 33 is carried by one of the hose pipes near its nozzle, and when the hose pipes are practically entirely wound upon the spool, this abutment 33 will engage the switch 34 to open the switch and stop operation of the motor. The switch 34 is, of course, manually moved to a closed position when the apparatus is set in operation.

In Figure 6, there has been shown a modified construction wherein the tubular shaft or pipe 35 corresponding to the pipe 2 is disposed in an overhead position and supported by pipes 36 and 37, the pipe 36 constituting the feed pipe and being provided with a control valve 38. The pipe 35 will be plugged at its connection with the pipe or standard 37, and a number of drums or spools 39 mounted upon this pipe 35 and disposed over the bed 1. Water flows from the pipe or tube 35 into the hose pipes 40 carried by the spools 39 when the valve 38 is open, and when the motor 41 is operated in a direction to transmit rotary motion to the tube or shaft 35 through the medium of the belt 42 trained about the pulleys 43 and 44, the hose pipes will be unwound from the spools, whereas when rotation of the motor is reversed, the hose pipes will be wound upon the spools. The hose pipes extend downwardly from the spools for engagement about the pulley wheels 45 carried by the shafts 46 which extend across ends of the bed. Pull upon the hose pipes to shift them along the bed as they are unwound is exerted in the same manner previously described, and reversing of the motor for rewinding also accomplished in the same manner.

Having thus described the invention, what is claimed as new is:

1. The combination with a growing bed, linear members extending along said bed longitudinally thereof and constituting a track, bridges extending transversely across said bed for supporting the linear members and having recesses below the same, a spool rotatably mounted adjacent one end of said bed, a hose pipe wound about said spool and having a spray nozzle at its outer end resting upon said track, a depending fin for the spray nozzles extending between the linear members forming the track and adapted to pass through the recesses of said bridges, means connected with said spray nozzles for shifting the same along the track and exerting pull to unwind the hose pipes from said spool, and means for effecting rewinding of the hose pipes upon the spool during reverse movement of the spray nozzles along the track.

2. In combination with a growing bed, a spool rotatably mounted at one end of said bed, a hose pipe wound about said spool, a spray nozzle at the outer end of said hose, guide means carried by the spray nozzle and comprising a depending fin, a guide at the opposite end of said bed from said spool, a cable secured to said nozzle and extending along said bed and about said guide, means for exerting pull upon the cable to shift the nozzle along the bed and unwind the hose, and means for effecting rewinding of the hose.

3. In combination with a growing bed, a spool rotatably mounted adjacent one end of said bed, a hose pipe wound about said spool, a rewind drum rotatably mounted at one end of said spool, said spool being rotatable independently of the drum in a direction to unwind the hose, the drum having means for imparting rotary motion to the spool when turned in a rewinding direction, a track extending along said bed, spray nozzles carried by the outer end of the hose for moving along said track, a pull line connected with said nozzle and extending along said bed, a guide at the opposite end of the bed from said spool engaged by said pull line, a cable connected with said pull line and engaged about said drum for rotating the drum, and means for shifting said cable longitudinally, said cable when shifted in one direction exerting pull upon the pull line to move the spray nozzles along the track and effect unwinding of said hose.

4. In combination with a growing bed, a spool rotatably mounted at one end of said bed, a hose pipe wound upon said spool, a track extending along said bed, a spray nozzle carried by the outer end of said hose for moving along said track, a rewind drum rotatably mounted in confronting relation to one end of said spool, pawls for turning the spool with the drum in a rewinding direction and permitting rotation of the drum and spool independently of each other in an unwinding direction, a guide at the opposite end of said bed from said spool, a pull line secured at one end to said nozzle and extending along said bed and engaged about said guide, a drive shaft, a friction pulley carried by said shaft, and a cable connected at one end with said pull line and at its other end with said nozzle, said cable being engaged about said drum and coiled about said friction pulley whereby said cable may be shifted longitudinally and when moved in one direction exert pull upon the pull line to move the nozzle along said track and unwind the hose from the reel.

5. In combination with a growing bed, a spool rotatably mounted adjacent one end of said bed, hose pipes wound upon said spool, nozzles at the outer ends of said hose pipes, tracks extending along said bed longitudinally thereof and engaged by said nozzles, guide means at the opposite ends of said bed from said spool, pull lines connected with said nozzles and extending along said bed and engaged with said guide means, a cross bar secured between ends of said pull line, a cable connected at one end to said cross bar, means for shifting said cable longitudinally to exert pull upon said pull line and moving said nozzles along said track while unwinding the hose pipes from said spool, and means actuated during shifting of the cable in an opposite direction to effect rotation of said spool in a direction to rewind the hose pipes thereon.

FREDERICK NEWMAN.